United States Patent [19]

Tobias et al.

[11] 4,229,555

[45] Oct. 21, 1980

[54] LINEAR POLYESTER COIL COATING COMPOSITIONS

[75] Inventors: Michael A. Tobias, Bridgewater; Conrad L. Lynch, Edison, both of N.J.

[73] Assignee: Mobil Oil Corporation, New York, N.Y.

[21] Appl. No.: 61,145

[22] Filed: Jul. 26, 1979

Related U.S. Application Data

[63] Continuation-in-part of Ser. No. 914,640, Jun. 12, 1978.

[51] Int. Cl.² ............................................. C08G 63/76
[52] U.S. Cl. .................................... 525/443; 528/302; 528/305
[58] Field of Search .................. 525/443; 528/302, 305

[56] References Cited

U.S. PATENT DOCUMENTS

| | | | |
|---|---|---|---|
| 3,804,920 | 4/1974 | Cunningham et al. | 525/443 |
| 3,819,757 | 6/1974 | Dörffel et al. | 525/30 |
| 3,953,403 | 4/1976 | Fujiyoshi et al. | 525/437 |
| 4,072,662 | 2/1978 | van der Linde et al. | 528/302 |
| 4,075,261 | 2/1978 | Fujiyoshi et al. | 525/443 |
| 4,088,619 | 5/1978 | Holzrichter | 260/29.4 R |
| 4,101,496 | 7/1978 | Dörffel et al. | 260/31.2 R |
| 4,153,782 | 5/1979 | Coney | 528/302 |
| 4,176,224 | 11/1979 | Bier et al. | 528/309 |

*Primary Examiner*—Lucille M. Phynes
*Attorney, Agent, or Firm*—Charles A. Huggett; Ronald J. Cier

[57] ABSTRACT

Linear thermosettable polyester resin compositions are prepared from benzenedicarboxylic acid, an alkyl dicarboxylic acid, (e.g. 1,6-hexanedioic acid), and a short chain alkylene diol component (e.g. 2,2-dimethyl-1,3-propanediol), the resin having a number average molecular weight of about 1,500 to about 5,000 and combined acid and hydroxyl values of about 20 to about 60 mg of KOH per gram of polyester. When these polyesters are combined with an aminoplast and an acid catalyst they form coating compositions which, when applied to a substrate and cured, provide a coating having an outstanding combination of hardness, adhesion, extendability, flexibility and dry heat resistance.

15 Claims, No Drawings

LINEAR POLYESTER COIL COATING COMPOSITIONS

CROSS-REFERENCES TO RELATED APPLICATIONS

This is a continuation-in-part of copending application Ser. No. 914,640, filed 12 June 1978.

BACKGROUND OF THE INVENTION

1. Field of the Invention

This invention relates to thermosettable polyester resin coating compositions.

2. Description of the Prior Art

In U.S. Pat. No. 3,804,920 there are disclosed coating compositions based on a combination of a linear, stiff polyester characterized by high (e.g. >25%) aromatic content with a linear, highly flexible polyester characterized by relatively low (e.g. <20%) aromatic content.

Applicants are aware of no polyester resin coatings, based on the compositions disclosed below exhibiting the outstanding balance of desirable properties possessed by the formulations hereinafter described.

SUMMARY OF THE INVENTION

The invention disclosed herein encompasses a new and useful class of linear thermosettable polyester resins, and coating compositions based on such resins, exhibiting outstanding coating characteristics. The polyester resins of our invention, when combined with an appropriate aminoplast and an acid catalyst, and properly applied to a substrate and cured, produce coatings possessing a combination of hardness, adhesion, extendability, flexibility and dry heat resistance superior to that of known coating compositions.

The resins are the condensation products of a reaction mixture comprising about 38 to about 43 weight percent of a short chain alkylene diol component (e.g.: 2,2-dimethyl-1, 3-propanediol), about 11 to about 17 weight percent of an alkyl dicarboxylic acid having a backbone of about 4 to 7 carbon atoms in the primary carbon chain between the two carboxylic acid functionalities (e.g.: 1,6-hexanedioic acid), and about 40 to about 47 weight percent of a benzenedicarboxylic acid component. These components are desirably combined in ratios such that the reaction products thereof result in a composition having a number average molecular weight of from about 1,500 to about 5,000 and a combined acid and hydroxyl number of about 20 to about 60 milligrams of KOH per gram of polyester.

DESCRIPTION OF THE PREFERRED EMBODIMENTS

Polyester Resins

The diol component of the polyester resins of the present invention comprises one or more short chain alkylene diol compounds having a molecular weight of about 60 to about 110. The preferred compounds are 2,2-dimethyl-1,3-propanediol (neopentyl glycol) either by itself or in combination with other diol compounds, such other diol compounds including but not limited to 1,3-butanediol, 1,2-ethanediol, and 1,2-propanediol. The diol component is used in an amount between about 38 percent and about 43 percent by weight of the reaction mixture, based on the total weight of the reactants.

The alkyl dicarboxylic acid component comprises a linear or branched dicarboxylic acid having about 4 to 7 carbon atoms in the primary carbon chain, that is the chain of carbon atoms extending between the two carboxylic acid groups. The most preferred compound is 1,6-hexanedioic acid (adipic acid). Examples of other useful compounds include, but are not limited to, heptanedioic acid, octanedioic acid, nonanedioic acid, and related compounds, as well as analogues and derivatives thereof. Such alkyl dicarboxylic acid component comprises from about 11 percent to about 17 percent by weight of the reaction mixture, based on the total weight of the reactants.

The third component of the polyester resin compositions is a benzenedicarboxylic acid compound. Any of the isomers of benzenedicarboxylic acid are suitable, but preferred are 1,3-benzenedicarboxylic acid (isophthalic acid) and mixtures of 1,3-benzenedicarboxylic acid with 1,2-benzenedicarboxylic acid or anhydride (phthalic acid or anhydride). The aromatic acid component is used in an amount between about 40 percent and about 47 percent by weight of the reaction mixture, based on the total weight of the reactants.

The esterification reaction is normally carried out at temperatures between about 190° C. and about 240° C., for a period of time ranging between about 3 hours and about 12 hours. A conventional catalyst for the promotion of esterification reactions, such as dibutyltin oxide, dibutyltin dilaurate, or triphenyl phosphite, can be used in catalytic amounts (e.g.: 0.01 to 1.0 percent be weight) to aid in the reaction. During the reaction, it is advantageous to remove the water evolved from the esterification, for instance by means of a suitable trap which condenses and draws off the water vapors, by azeotropic distillation with a solvent such as toluene or xylene, or by flushing the reactor with an inert gas to sweep the vapors away from the reactants. The reactants are combined in appropriate relative amounts, substantially within the specified range, such that the polyester product of the above reaction process has a number average molecular weight of from about 1,500 to about 5,000 and a combined acid and hydroxyl value of about 20 to about 60 milligrams of KOH per gram of polyester.

Coating Compositions

The essential components of the coating compositions of this invention are the polyester resin, in aminoplast, an acid catalyst, and an inert organic solvent.

The material used to thermoset the coating is a conventional aminoplast cross-linking agent.

There may be used any of the thermosetting alkylated aminoplast resins, such as the urea-aldehyde resins, the melamine-aldehyde resins, the dicyandiamide-aldehyde resins, and other aminoplast-aldehyde resins such as those triazine resins produced by the reaction of an aldehyde with formoguanamine, ammeline, 2-chloro-4,6-diamino-1,-3,5-triazine, 6-methyl-2,4-diamino-1,3,5-triazine,2,4,6-trihydrazine-1,3,5-triazine, and 2,4,6-triethyl-triamino-1,3,5-triazine. Generally, such resins are alkylated with an alcohol, such as methanol or butanol. Aldehydes useful for reaction with the amino compounds to form the resinous material include, for example, formaldehyde, acetaldehyde, crotonaldehyde, acrolein, or compounds which engender aldehydes, such as hexamethylenetetramine, paraldehyde, paraformaldehyde, and the like. The amount of aminoplast used is between about 5 weight percent and about 35 weight percent on resin solids.

The acid catalyst can be the acid itself or a derivative that will generate the acid in situ, such as commercially available Aerosol OT which generates sulfonic acid and $NH_4NO_3$ which can be decomposed to $HNO_3$. Acids that generally are used to cure aminoplast systems include p-toluenesulfonic acid (pTSA), benzenesulfonic acid, methylsulfonic acid, cyclohexyl sulfonic acid, phosphoric acid, mono- or dialkyl acid phosphates, and many other indicated in the art as suitable curing catalysts. The amount of acid catalyst used usually is between about 0.1 weight percent and about 1.0 weight percent, based upon total resin solids.

The solvents utilizable in the coating compositions of this invention are the usual volatile solvents used in paints and enamels. Aromatic hydrocarbons are utilizable, such as toluene, xylene, and aromatic petroleum cuts [e.g.: Hi-Sol 4-1 (boils 190.6°–260.0° C.) and Solvesso 100 (boils 155.6°=172.2° C.)]. Ketones utilizable include methyl isobutyl ketone (MIBK), isophorone, ethyl amyl ketone, and methyl n-amyl ketone. Alcohols such as butanol, amyl alcohol, 2-ethylhexanol, and cyclohexanol are likewise suitable solvents. Also utilizable are the ether alcohols and their acetate esters, such as methoxyethanol, ethyoxyethanol, butoxyethanol, hexoxyethanol, methoxypropanol, methoxyethyl acetate, and ethoxyethyl, acetate. It is within the contemplation of this invention to use mixtures of two or more solvents. The proportion of solvents used is not critical, since they are primarily the volatile vehicle to convey the resin material to the substrate to be coated. The total amount of solvents used will be sufficient to provide a solids content (% NVM) of between about 25 weight percent and about 55 weight percent in the coating composition prior to pigmentation.

It is preferred to incorporate a pigment into the coating composition of this invention. The preferred white pigment is titanium dioxide, but any well-known pigment may be used, such as zinc oxide, bentonite, silica, iron oxide, carbon black and chrome yellows, greens, oranges, etc. Organic pigments may also be used. Sufficient pigment is used to provide an opaque or colored film as needed for the desired appearance.

The coating compositions of this invention can be applied to the usual substrates, i.e., metal, paper, leather, cloth, etc., using any of the usual methods of application including spraying, direct rollcoating, reverse rollcoating, electrodeposition, flow coating, and the like. The coating composition is primarily useful for coating aluminum, steel, tin plated steel, electro-galvanized steel, and hot dipped galvanized steel. Such metal substrates are usually cleaned and chemically treated to improve the wetting and adhesion of subsequent organic coatings. The coating compositions of this invention are equally useful for primers or topcoats with either the same or different types of resinous compositions. After coating the substrate, the coating is cured, preferably by baking for about 5 seconds to about 25 minutes at between about 120° C. and about 315° C. A typical fast bake is for about 40 seconds at about 240°–255° C.

The following examples demonstrate the preparation of the polyester resins of this invention and coating compositions containing them, along with performance characteristics of such coatings.

EXAMPLE 1

A ten gallon reactor was charged with 8978.2 grams of 2,2-dimethyl-1,3-propanediol, 3390.2 grams of 1,6-hexanedioic acid, 2811.6 grams of 1,2-benzenedicarboxylic anhydride, 6798 grams of 1,3-benzenedicarboxylic acid and 22 grams of dibutyltin oxide. The contents of the reaction vessel were gradually heated to 235° C. while removing the water of reaction through a steam jacketed distillation column. When an acid number of 33.5 was obtained, 550 grams of toluene were added to azeotropically remove the remaining water produced by esterification. The reation was continued until an acid number of 10.3 was obtained. The resulting polyester was reduced to 65.5 percent non-volatiles by the addition of Solvesso 150 solvent to afford a material with an acid number of 8.6, a hydroxyl number of 15.1, Gardner Holdt viscosity of Z3+, a Gardner Color of 1+, and a weight of 8.88 pounds per gallon.

EXAMPLES 2–10

The following table contains examples of linear thermosetting polyesters which were prepared by the same technique as that of Example 1.

EXAMPLE 11

A portion of the polyester solution of Example 1 was combined with 12.5% of hexamethoxymethylmelamine crosslinker on resin solids and pigmented with $TiO_2$ pigment at a pigment/resin ratio of 1/1, catalyzed with 1.3% on resin solids of a 20% pTSA solution, and reduced to 66.4% NVM (Non-Volatile Material) with Cellosolve Acetate and Solvesso 100. This coating composition was applied on Bonderite 901 treated cold rolled steel panels at 0.8 mils dry film thickness and baked at 243° C. for 40 seconds. The cured coating showed a 94 gloss, H-2H pencil hardness, greater than 100 MEK double rubs and passed a OT-Bend and 120 inch/lb reverse impact bump with no fracture or loss of adhesion when tested with Scotch tape. In addition, the OT-Bend did not shrink or break open when reheated at 935° C. for 10 minutes.

The gloss was determined in accordance with ASTM Designation D-523–67, the reverse impact resistance according to ASTM Designation D-2794–69 and adhesion via ASTM Designation D-3359–76. The other test procedures were as follows:

Fabrication 180° Bend (OT-Bend)—The panel is manually bent into a U-shape. A number of thicknesses of the substrate (in this case, no thicknesses or OT) are placed in the bend area and the entire assembly is placed in the jaws of of a press and pressed. Scotch tape is applied across the bend and removed quickly. The adhesion of the coating after bending is rated on a scale of 0 to 10 with 10 representing perfect, i.e., no coating was pulled off with the tape.

TABLE I

| | POLYESTER COMPOSITION, WT. % | | | | | |
|---|---|---|---|---|---|---|
| Example No. | 2,2-dimethyl-1,3-propanediol | 1,2-propanediol | 1,3-butanediol | 1,6-hexanedioic acid | 1,3-benzene-dicarboxylic acid | 1,2-benzene dicarboxylic anhydride |
| 1 | 40.85 | — | — | 15.43 | 30.93 | 12.79 |
| 2 | 42.49 | — | — | 17.02 | 27.99 | 12.50 |
| 3 | 42.38 | — | — | 15.31 | 29.84 | 12.47 |

TABLE I-continued

| | | | | | | |
|---|---|---|---|---|---|---|
| 4 | 42.27 | — | — | 13.35 | 31.95 | 12.44 |
| 5 | 41.62 | — | — | 15.37 | 30.38 | 12.63 |
| 6 | 41.56 | — | — | 14.34 | 31.49 | 12.61 |
| 7 | 41.34 | — | — | 15.30 | 30.67 | 12.69 |
| 8 | 40.73 | — | — | 13.29 | 33.22 | 12.76 |
| 9 | 33.00 | 6.00 | — | 17.00 | 44.00 | — |
| 10 | 29.42 | — | 9.92 | 15.66 | 45.00 | — |

PROPERTIES

| Example No. | Acid No. | Hydroxyl No. | MOLECULAR WEIGHT* No. Avg. | Wgt. Avg. |
|---|---|---|---|---|
| 1 | 8.6 mg KOH/gm | 15.1 mg KOH/gm | 2923 | 7893 |
| 2 | 0.9 | 39.7 | 2050 | 5051 |
| 3 | 0.9 | 38.6 | 2310 | 5593 |
| 4 | 0.9 | 39.1 | 2170 | 5461 |
| 5 | 5.0 | 30.6 | 2322 | 6352 |
| 6 | 4.8 | 31.6 | 2477 | 7110 |
| 7 | 7.0 | 28.1 | 2571 | 6813 |
| 8 | 8.9 | 21.9 | 2579 | 7853 |
| 9 | 8.7 | 22.4 | 3425 | 8942 |
| 10 | 12.8 | 25.4 | 2658 | 7235 |

FOOTNOTES:
*Number average and weight average molecular weights as determined by gel permeation chromatography against a polystyrene calibration standard.

Pencil Hardness Test—A set of pencils ranging from 6B (soft) to 6H (hard) are used, starting with the hard end of the set. These pencils are pushed in turn into the film. The first pencil which crumbles instead of penetrating indicates the pencil hardness.

MEK Double Rubs—A pad of felt (2" square) soaked in MEK (methylethyl ketone) is rubbed back and forth across the coated surface, while the panel is resting on a firm surface. Each stroke is 2½-3" in length at a uniform pressure of about 900 grams and at a rate of about 100 rubs per minute. The pad is re-soaked with MEK after 50 double rubs, or before, if increase in friction makes it necessary. One double rub is considered as one back and forth stroke. One hundred double rubs should only slightly dull the surface in the center area of the rub.

EXAMPLE 12

A portion of the polyester from Example 2 was combined with 22% of hexamethoxymethylmelamine crosslinker on resin solids and pigmented with $TiO_2$ at a pigment to binder ratio of 1/1, catalyzed with 1.3% on resin solids of a 20% pTSA solution, and reduced to 60% NVM with Isophorone and MIBK. This coating composition was applied on Bonderite 901 treated cold rolled steel panels at 0.8 mils dry film thickness and baked 40 seconds at 265° C. This coating showed an F-H pencil hardness, greater than 100 MEK double rubs, and passed a 2T-bend and a 160 inch/lb reverse impact with no fractures or loss of adhesion when tested with No. 610 Scotch tape. In addition, the 2T-Bend did not shrink or break open when reheated at 93° C. for 10 minutes.

EXAMPLE 13

The polyester resin from Example 7 was made up as a coating composition by adding 17.5% hexamethoxymethylmelamine as a crosslinker, 1.2% of a 20% pTSA solution on resin solids as a catalyst, pigmenting it with $TiO_2$ at a 1/1 pigment to binder ratio and reducing it to 65.9% NVM and 25 seconds #4 Zahn Cup with Isophorone and Solvesso 100. This coating composition was coated on 20 mil cold rolled steel treated with Bonderite 901 at 0.85 mils dry film thickness and baked at 260° C. for 40 Seconds. The cured coating passed 100 MEK double rubs, showed an F-H pencil hardness and passed a OT-Bend with no microfractures or loss of adhesion when tested with Scotch tape.

EXAMPLE 14

The polyester solution from Example 8 was blended with 12% of a highly methylated melamine plus 6% of hexamethoxymethylmelamine and pigmented with $TiO_2$ at a pigment to binder ratio of 1/1, catalyzed with 3% of a 20% pTSA solution on resin solids and reduced to 63.9% NVM with Isophorone and Solvesso 100. This coating composition was coated on 20 mil Bonderite 901 treated cold rolled steel panels at 0.8 mils dry film thickness and baked at 182° C. for 40 seconds (approximately 154° C. peak metal temperature). Film properties on these panels were excellent. Gloss was 93, pencil hardness was H to 2H, and a OT-Bend and 120 inch/lb reverse impact showed only slight cracking and loss of adhesion when tested with Scotch tape. In addition the coating did not shrink or "pop" open when reheated at 93° C. for 10 minutes.

EXAMPLE 15

A portion of the polyester from Example 9 was combined with 12.5% of a highly methylated melamine and pigmented with $TiO_2$ at a pigment to binder ratio of 1/1, catalyzed with 2% on resin solids of a 20% pTSA solution, and reduced to 64% NVM with Cellosolve Acetate and Isophorone. This coating composition was applied on Bonderite 901 treated cold rolled steel panels at 0.8 mils dry film thickness and baked at 204° C. for 40 seconds (approximately 177° C. peak metal temperature). The cured coating showed 86 gloss, HB to F pencil hardness, 100 MEK double rubs, and passed a 2T-Bend and 120 inch/lb reverse impact with no fracture or loss of adhesion when tested with Scotch tape. Also, the 2T-Bend did not shrink or break open when subjected to "dry heat" at 93° C. for 10 minutes.

Although the present invention has been described with reference to preferred embodiments, it is to be understood that modifications and variations may be resorted to without departing from the spirit and scope of the invention, as those skilled in the art will readily understand. Such modifications and variations are considered to be within the purview and scope of the appended claims.

We claim:

1. A linear thermosettable polyester resin derived from a reaction mixture comprising:
   (a) between about 38 and 43 percent by weight of a short chain alkylene diol component;
   (b) between about 11 and about 17 percent by weight of an alkyl dicarboxylic acid having 4 to 7 carbon atoms in the primary carbon chain between the two carboxylic acid groups;
   (c) between about 40 and 47 percent by weight of a benzenedicarboxylic acid component; and
   (d) said polyester resin having a number average molecular weight of from about 1,500 to about 5,000 and a combined acid and hydroxyl number of about 20 to about 60 milligrams of KOH per gram of polyester.

2. The polyester resin of claim 1 wherein the alkylene diol component is 2,2-dimethyl-1,3-propanediol.

3. The polyester resin of claim 1 wherein the alkylene diol component comprises 2,2-dimethyl-1,3-propanediol in admixture with one or more members of the group consisting of 1,3-butanediol, 1,2-ethanediol and 1,2-propanediol.

4. The polyester resin of claim 1 wherein the alkyl dicarboylic acid component is 1,6-hexanedioic acid.

5. The polyester resin of claim 1 wherein the benzenedicarboxylic acid component is one or more members of the group consisting of: 1,3-benzenedicarboxylic acid, 1,2-benzenedicarboxylic acid and 1,2-benzenedicarboxylic anhydride.

6. The polyester resin of claim 5 wherein the benzenedicarboxylic acid component is 1,3-benzenedicarboxylic acid.

7. The polyester resin of claim 1 wherein the alkylene diol component is 2,2-dimethyl-1,3-propanediol, the alkyl dicarboxylic acid component is 1,6-hexanedioic acid and the benzenedicarboxylic acid component is 1,3-benzenedicarboxylic acid.

8. The polyester resin of claim 1 wherein the alkylene diol component is 2,2-dimethyl-1,3-propanediol, the alkyl dicarboxylic acid component is 1,6-hexanedioic and the benzenedicarboxylic acid component comprises a mixture of 1,3-benzenedicarboxylic acid with 1,2-benzenedicarboxylic anhydride.

9. A coating composition comprising the polyester resin of claim 1, between about 5 and about 35 weight percent of an aminoplast cross-linking agent on resin solids, between about 0.1 and about 1.0 weight percent of an acid catalyst on resin solids, and an inert organic solvent in an amount sufficient to provide a solids content of between about 25 weight percent and about 55 weight percent, based on the weight of the composition.

10. The coating composition of claim 9 additionally comprising a pigmenting agent.

11. A coating composition comprising the polyester resin of claim 7, between about 5 and about 35 weight percent of an aminoplast cross-linking agent on resin solids, between about 0.1 and about 1.0 weight percent of an acid catalyst on resin solids, and an inert organic solvent in an amount sufficient to provide a solids content of between about 25 weight percent and about 55 weight percent, based on the weight of the composition.

12. A coating composition comprising the polyester resin of claim 8, between about 5 and about 35 weight percent of an aminoplast cross-linking agent on resin solids, between about 0.1 and about 1.0 weight percent of an acid catalyst on resin solids, and an inert organic solvent in an amount sufficient to provide a solids content of between about 25 and about 55 weight percent, based on the weight of the composition.

13. A substrate having a coating of a cured composition of claim 9.

14. A substrate having a coating of a cured composition of claim 11.

15. A substrate having a coating of a cured composition of claim 12.

* * * * *

UNITED STATES PATENT AND TRADEMARK OFFICE
CERTIFICATE OF CORRECTION

PATENT NO. : 4,229,555
DATED : October 21, 1980
INVENTOR(S) : Michael Allan Tobias and Conrad Linden Lynch It is certified that error appears in the above-identified patent and that said Letters Patent are hereby corrected as shown below:

Column 2, line 37, "specified ranges" should be --specified range--

Column 4, line 17, "reation" should be --reaction--

Column 4, line 46, "935°C" should be --93°C--

Signed and Sealed this

Third Day of March 1981

[SEAL]

Attest:

RENE D. TEGTMEYER

Attesting Officer

Acting Commissioner of Patents and Trademarks